United States Patent
Bietz et al.

(10) Patent No.: US 11,937,550 B2
(45) Date of Patent: Mar. 26, 2024

(54) DRUM ASSEMBLIES FOR TURNING MATERIAL

(71) Applicant: Vermeer Manufacturing Company, Pella, IA (US)

(72) Inventors: Bryan Palmer Bietz, Tripp, SD (US); Duwayne Paul Bonhorst, Viborg, SD (US)

(73) Assignee: Vermeer Manufacturing Company, Pella, IA (US)

( * ) Notice: Subject to any disclaimer, the term of this patent is extended or adjusted under 35 U.S.C. 154(b) by 973 days.

(21) Appl. No.: 16/886,336

(22) Filed: May 28, 2020

(65) Prior Publication Data

US 2020/0396901 A1 Dec. 24, 2020

Related U.S. Application Data

(60) Provisional application No. 62/863,925, filed on Jun. 20, 2019.

(51) Int. Cl.
*A01D 78/00* (2006.01)

(52) U.S. Cl.
CPC .................................. *A01D 78/006* (2013.01)

(58) Field of Classification Search
CPC . B02C 21/00; B02C 21/002; B02C 2021/023; A01B 9/00–006; A01B 33/00–025; A01B 39/14; A01D 78/006; A01D 78/00; Y02W 30/40; C05F 17/943; Y02P 20/145; B01F 27/70; B01F 33/5021
USPC .......................................................... 241/56
See application file for complete search history.

(56) References Cited

U.S. PATENT DOCUMENTS

| | | | | |
|---|---|---|---|---|
| 3,369,797 A * | 2/1968 | Cobey | ...................... | A01C 3/00 366/196 |
| 4,360,065 A * | 11/1982 | Jenison | ................ | A01B 33/021 172/119 |
| 5,253,467 A * | 10/1993 | Sims, Jr. | .................. | B01F 33/83 56/372 |
| 5,586,731 A * | 12/1996 | Glaze | ........................ | B09C 1/10 241/101.76 |
| 6,047,910 A | 4/2000 | Murphy | | |
| 6,893,862 B1* | 5/2005 | Horn | ......................... | B09C 1/10 435/243 |
| 6,948,669 B1* | 9/2005 | Mehlhaf | .............. | A01B 33/082 384/114 |

(Continued)

OTHER PUBLICATIONS

Komptech Compost Turner, available before Jun. 20, 2019.

(Continued)

*Primary Examiner* — Adam J Behrens
(74) *Attorney, Agent, or Firm* — Armstrong Teasdale LLP

(57) ABSTRACT

A drum assembly for turning material. The drum assembly includes a drum having a first end, a second end, a rotational axis extending through the first end and the second end about which the drum rotates. The drum includes a first outer portion, a second outer portion, and a central portion. A plurality of centering paddles are connected to the drum and configured to move material toward a central plane. A plurality of dispersal paddles are connected to the drum and configured to move material away from the drum in a direction generally perpendicular to the rotational axis. A plurality of spreading paddles are connected to the drum and configured to move material away from the central plane.

20 Claims, 9 Drawing Sheets

(56) References Cited

U.S. PATENT DOCUMENTS

| | | | | |
|---|---|---|---|---|
| 8,844,254 B2 * | 9/2014 | Hansen | ................. | A01D 78/02 |
| | | | | 56/372 |
| 10,617,061 B2 * | 4/2020 | Anderson | ............... | C05F 17/00 |
| 10,779,453 B2 * | 9/2020 | Horsman | ............... | A01B 35/18 |
| 11,753,351 B1 * | 9/2023 | Anderson | .......... | B01F 35/3204 |
| | | | | 366/345 |

OTHER PUBLICATIONS

Backhus Compost Turner, available before Jun. 20, 2019.
Frontier Compost Turner, available before Jun. 20, 2019.
Scarab Compost Turner, available before Jun. 20, 2019.
Kooima Skid Turner, available before Jun. 20, 2019, https://kooima.com/shop/kooima-skid-trner/.
Midwest Bio-Systems Aeromaster Compost Turner, available before Jun. 20, 2019.
Vermeer CT616 Compost Turner, https://www.youtube.com/watch?v=kug4aWwoQgA, Aug. 26, 2017.
Vermeer CT718 Compost Turner, https://www.youtube.com/watch?v=Ap9RaybMPao, Feb. 20, 2018.

* cited by examiner

DRUM ASSEMBLIES FOR TURNING MATERIAL

CROSS-REFERENCE TO RELATED APPLICATION

This application claims the benefit of U.S. Provisional Patent Application No. 62/863,925, filed Jun. 20, 2019, which is incorporated herein by reference in its entirety.

FIELD OF THE DISCLOSURE

The field of the disclosure relates to drum assemblies for turning materials and, more specifically, drum assemblies including at least three types of paddles arranged thereon for improved turning of composting material and for creating a windrow of improved shape.

BACKGROUND

Composting materials, such as cut vegetation, may be arranged into long piles or windrows. Proper shaping of the windrow facilitates the composting process. For example, increasing the length of the sides of the windrow maximizes the amount of composting material exposed to air. To promote composting, the windrows may be periodically turned and reshaped. Turning and reshaping the windrow allows for the introduction of oxygen into the windrow and results in a more uniform temperature gradient within the windrow. Turning and reshaping also breaks apart clumps of composting material in the windrow. Windrows may be turned by a windrow turning apparatus (i.e., compost turner) that includes an elongate rotating drum that turns and shapes the windrow.

While turning the windrow, an amount of compost material may be recirculated around the rotating drum. Recirculation of material increases the drag of the rotating drum. Recirculation increases the power consumption of the compost turner and increases wear.

A need exists for drum assemblies that more uniformly turn composting material and create an improved windrow shape, while improving efficiency and limiting wear.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a drum assembly for turning material. The drum assembly includes a drum having a first end, a second end, a rotational axis extending through the first end and the second end about which the drum rotates, and a central plane perpendicular to the rotational axis. The drum includes a first outer portion, a second outer portion, and a central portion. The center plane extends through the central portion. The drum includes a first intermediary portion disposed between the first outer portion and the central portion, and a second intermediary portion disposed between the second outer portion and the central portion. A plurality of centering paddles are connected to the drum and configured to move material toward the central plane. A plurality of dispersal paddles are connected to the drum and configured to move material away from the drum in a direction generally perpendicular to the rotational axis. A plurality of spreading paddles are connected to the drum and configured to move material away from the central plane. A majority of paddles in the first outer portion are centering paddles. A majority of paddles in the second outer portion are centering paddles. A majority of paddles in the center portion are spreading paddles. A majority of paddles in the first intermediary portion are dispersal paddles. A majority of paddles in the second intermediary portion are dispersal paddles.

Another aspect of the present disclosure is directed to a drum assembly for turning material. The drum assembly includes a drum having a first end, a second end, a rotational axis extending through the first end and the second end about which the drum rotates, and a central plane perpendicular to the rotational axis. The drum includes a first outer portion, a second outer portion, and a central portion. The center plane extends through the central portion. The drum also includes a first intermediary portion disposed between the first outer portion and the central portion and a second intermediary portion disposed between the second outer portion and the central portion. A plurality of centering paddles are connected to the first outer portion of the drum. The centering paddles each have a material-engaging surface that contacts material as the drum rotates. The material-engaging surface extends between a leading edge and a trailing edge of the centering paddle. The material-engaging surface angles toward the central plane from the leading edge to the trailing edge. A plurality of centering paddles are connected to the second outer portion of the drum. The centering paddles each have a material-engaging surface that contacts material as the drum rotates. The material-engaging surface extends between a leading edge and a trailing edge of the centering paddle. The material-engaging surface angles toward the central plane from the leading edge to the trailing edge. A plurality of dispersal paddles are connected to the first intermediary portion. The dispersal paddles each have a material-engaging surface that contacts material as the drum rotates. The material-engaging surface is perpendicular to the central plane. A plurality of dispersal paddles are connected to the second intermediary portion. The dispersal paddles each have a material-engaging surface that contacts material as the drum rotates. The material-engaging surface is perpendicular to the central plane. A plurality of spreading paddles are connected to the center portion of the drum. The spreading paddles (1) are parallel to the central plane or (2) each have a material-engaging surface that contacts material as the drum rotates with the material-engaging surface extending between a leading edge and a trailing edge of the spreading paddle and the material-engaging surface angling away from the central plane from the leading edge to the trailing edge.

Yet a further aspect of the present disclosure is directed to a drum assembly for turning material. The drum assembly includes a drum including a first end, a second end, a rotational axis extending through the first end and the second end about which the drum rotates, and a central plane perpendicular to the rotational axis. The central plane divides the drum assembly into a first side and a second side. A plurality of centering paddles are connected to the drum and configured to move material toward the central plane. A plurality of dispersal paddles are connected to the drum and configured to move material away from the drum in a direction generally perpendicular to the rotational axis. A plurality of spreading paddles are connected to the drum and configured to move material away from the central plane.

The centering paddles, dispersal paddles and spreading paddles are configured to form a first helix on the first side of the drum and to form a second helix on the second side of the drum.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
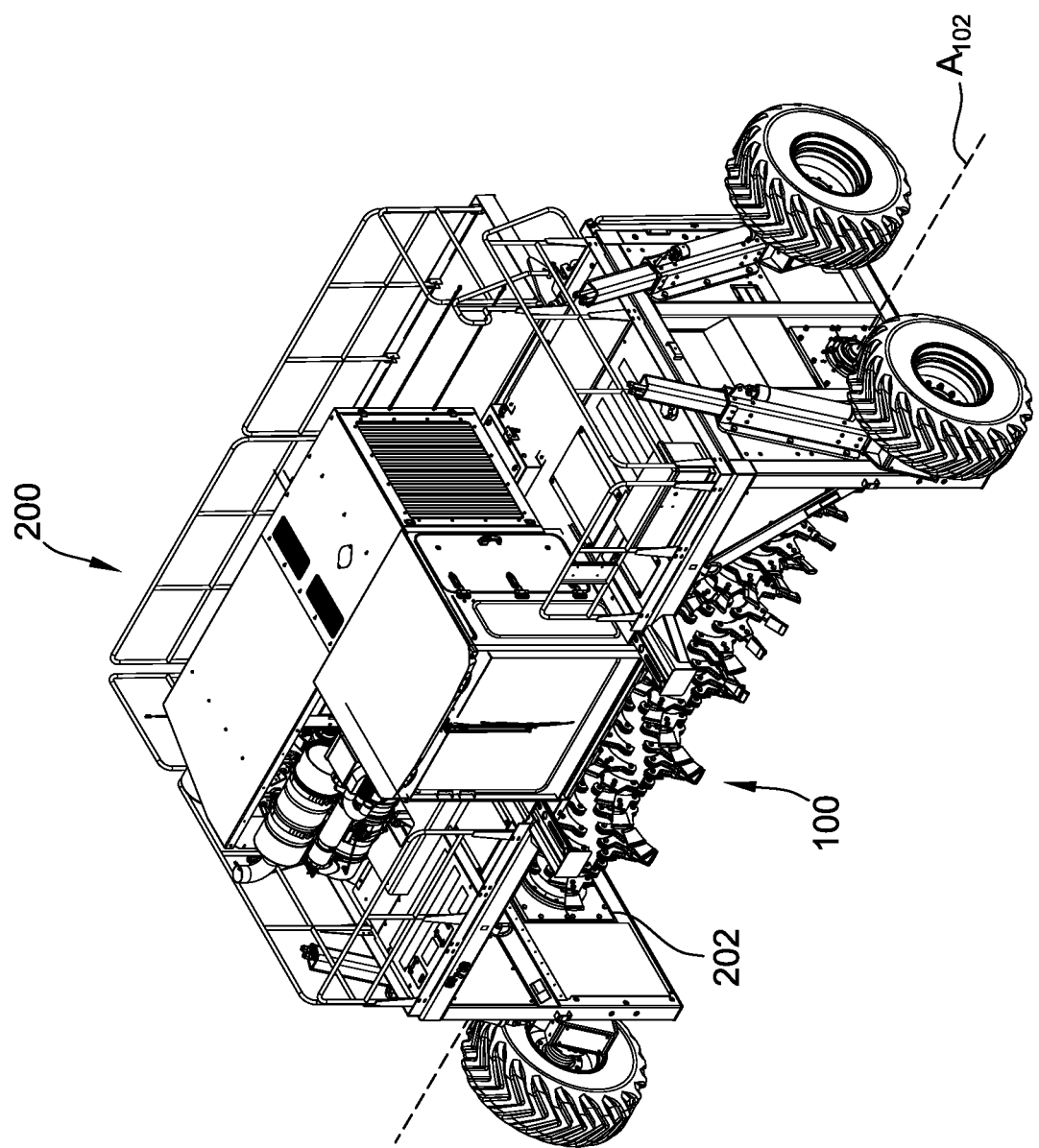
FIG. 1 is a perspective view of a compost turner.
Figure 2:
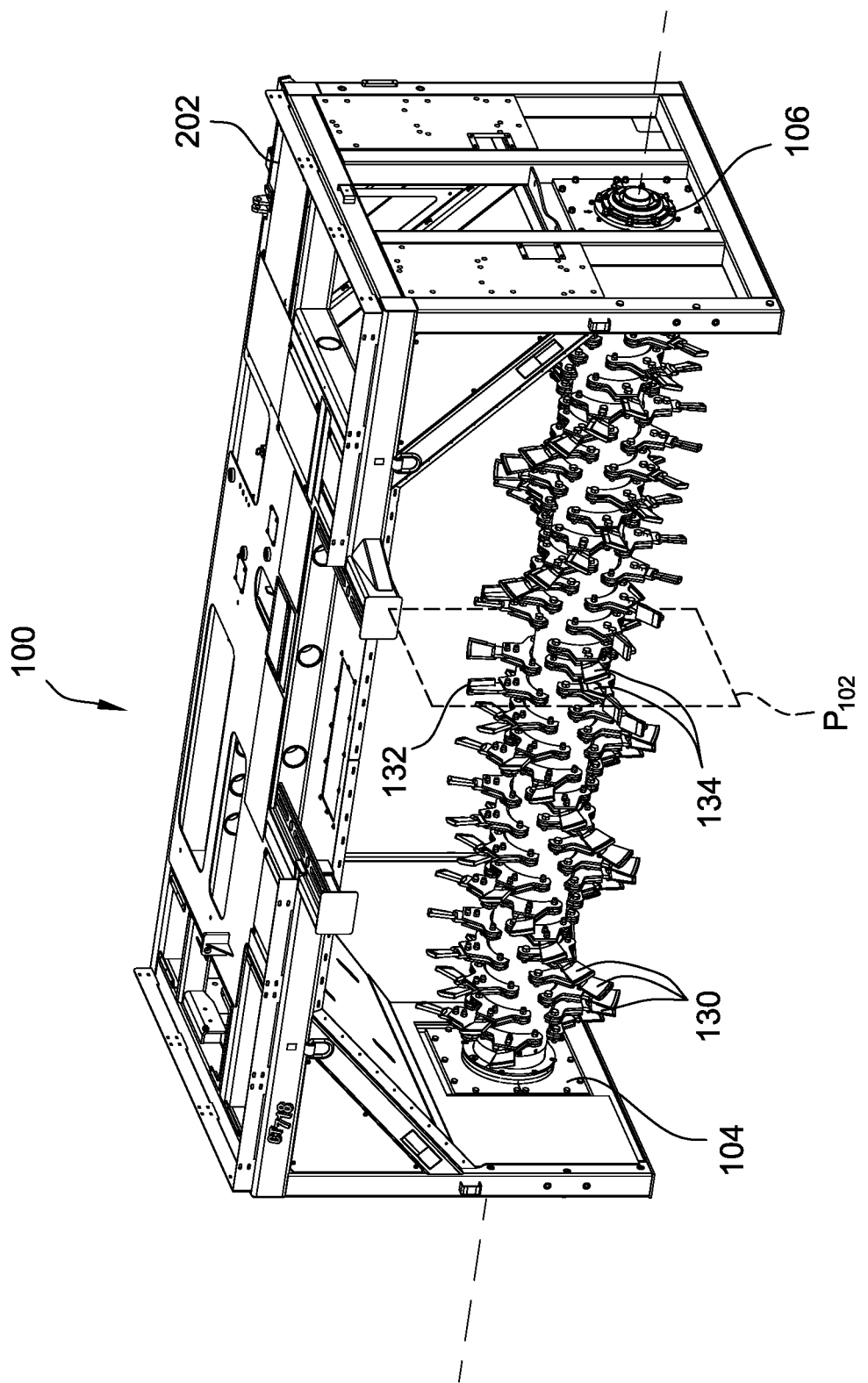
FIG. 2 is a perspective view of a drum assembly and mounting frame of the compost turner.

An example drum assembly 100 for turning material and shaping a windrow is shown in FIGS. 1-6. The drum assembly 100 may be part of a compost turner such as the compost turner 200 shown in FIG. 1. The drum assembly 100 may be mounted to the compost turner 200 such that the drum assembly 100 rotates to turn and shape a windrow while the compost turner 200 drives along the windrow. The drum assembly 100 may be mounted to a frame 202 which enables mounting and alignment of the drum assembly 100 to the compost turner 200. The drum assembly 100 is used to turn material such as composting material, including cut vegetation such as cut grass, trees, and the like.

The drum assembly 100 includes a drum 102 (FIG. 3) including a first end 104 and a second end 106. The drum 102 rotates about a rotational axis $A_{102}$ that extends through the first end 104 and the second end 106. The drum 102 includes a central plane $P_{102}$ perpendicular to the rotational axis $A_{102}$. The central plane $P_{102}$ divides the drum assembly 100 into a first side 160 and a second side 162. The drum assembly 100 may be symmetric across the central plane $P_{102}$ as shown. In other embodiments, the drum assembly 100 is non-symmetrical across the central plane $P_{102}$.

The drum 102 includes various axial portions or regions which include different types and/or arrangements of paddles. The drum 102 includes a first outer portion 110, a second outer portion 112, a first intermediary portion 114, a second intermediary portion 116, and a central portion 118. The central plane $P_{102}$ extends through the central portion 118. The first intermediary portion 114 is disposed between the first outer portion 110 and the central portion 118. The second intermediary portion 116 is disposed between the second outer portion 112 and the central portion 118. The first and second outer portions 110, 112 extend from the first and second intermediary portions 114, 116 to the first end 104 and second end 106 of the drum 102, respectively.

The drum assembly 100 includes a plurality of centering paddles 130, a plurality of dispersal paddles 132, and a plurality of spreading paddles 134 that are connected to the drum 102. The plurality of centering paddles 130 may move material toward the center plane $P_{102}$. The plurality of dispersal paddles 132 may move material away from the drum 102 such as in a direction generally perpendicular to the rotational axis $A_{102}$ of the drum 102. The plurality of spreading paddles 134 may move material away from the central plane $P_{102}$.

The plurality of centering paddles 130, the plurality of spreading paddles 134, and the plurality of dispersal paddles 132 are connected to the drum 102 in at least one of the first and or second outer portions 110, 112, the first and or second intermediary portions 114, 116, and/or the central portion 118.

In the illustrated embodiment, the majority of paddles in the first outer portion 110 are centering paddles 130. In addition, the majority of paddles in the second outer portion 112 are centering paddles 130. The majority of paddles in the central portion 118 are spreading paddles 134. The majority of paddles in the first intermediary portion 114 are dispersal paddles 132 and the majority of paddles in the second intermediary portion 116 are dispersal paddles 132.

In some embodiments, at least 67%, at least 75%, at least 90% or all of the paddles in the first outer portion 110 are centering paddles 130. In addition, at least 67%, at least 75%, at least 90% or all of the paddles in the second outer portion 112 may be centering paddles 130. Alternatively or in addition, at least 67%, at least 75%, at least 90% or all of paddles in the center portion 118 may be spreading paddles 134. Alternatively or in addition, at least 67%, at least 75%, at least 90% or all of paddles in the first intermediary portion 114 are dispersal paddles 132 and at least 67%, at least 75%, at least 90% or all of paddles in the second intermediary portion 116 are dispersal paddles 132.

In some embodiments, each of the individual dispersal paddles 132, spreading paddles 134, and centering paddles 130 are equivalent in weight. Specifically, the dispersal paddles 132 each have a weight equivalent to a weight of each spreading paddle 134 and also have a weight equivalent to each centering paddle 130. In alternative embodiments, the centering paddles 130, the dispersal paddles 132, and the spreading paddles 134 may be of different weights and the paddles 130, 132, 134 may be arranged on the drum 102 such that the weight of the drum 102 assembly is symmetric on either side of the center plane $P_{102}$.

Figure 4:
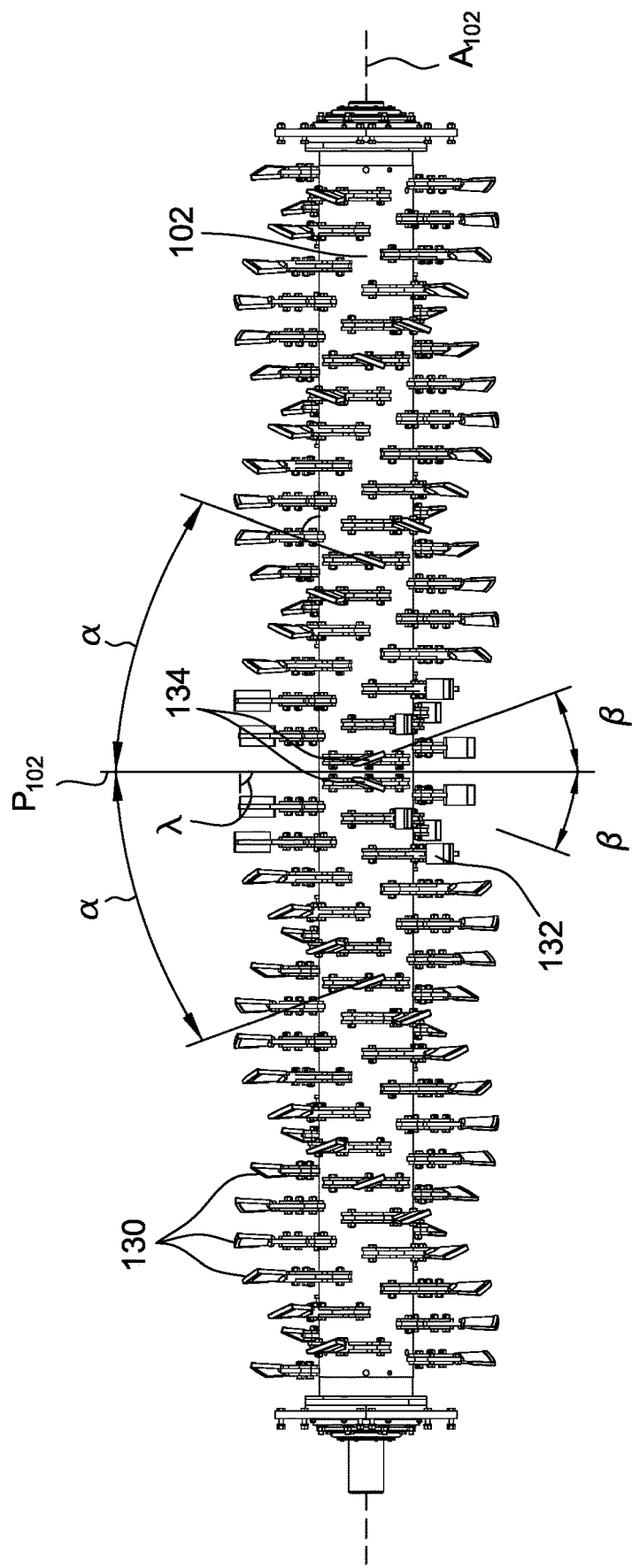
FIG. 4 is a top view of the drum assembly.
Figure 5:
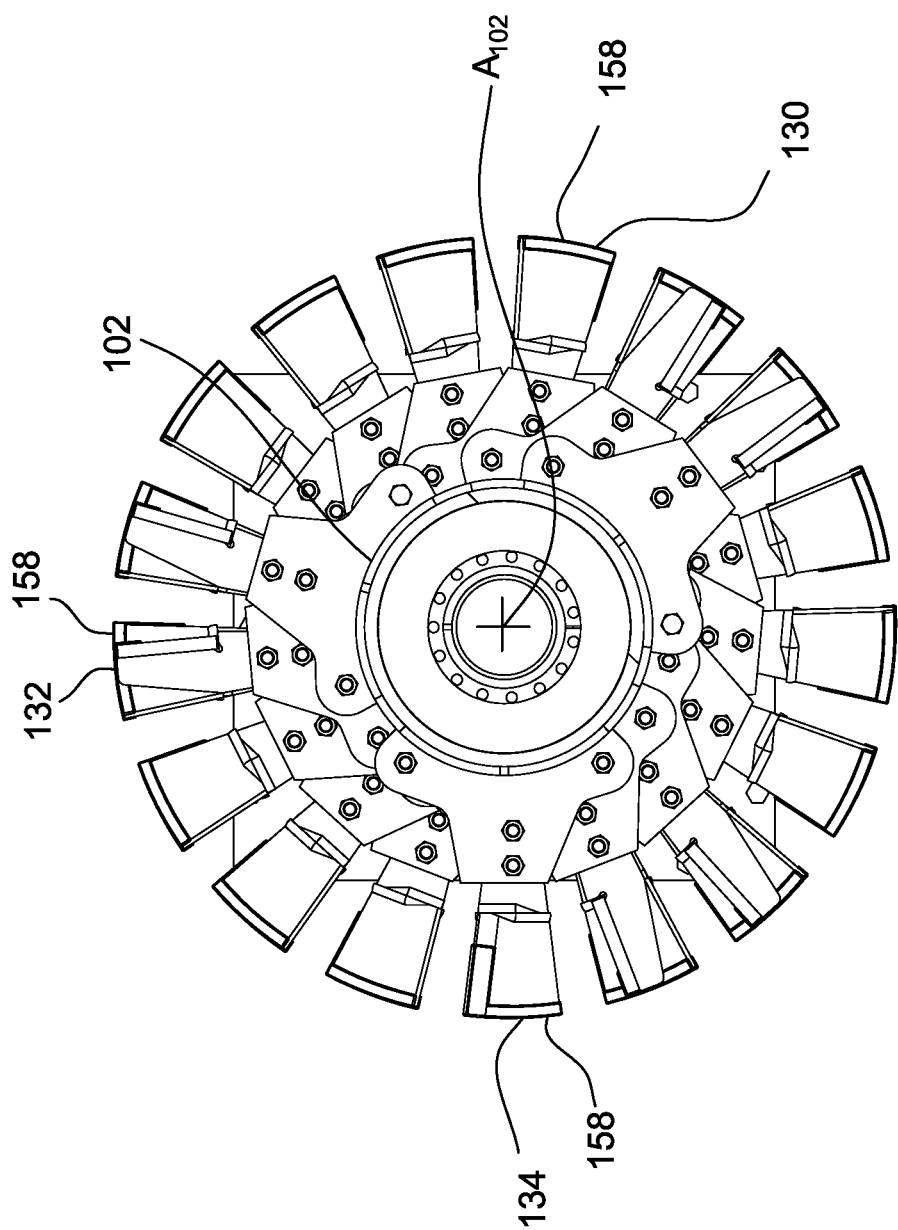
FIG. 5 is a cross-sectional view of the drum assembly.
Figure 7:
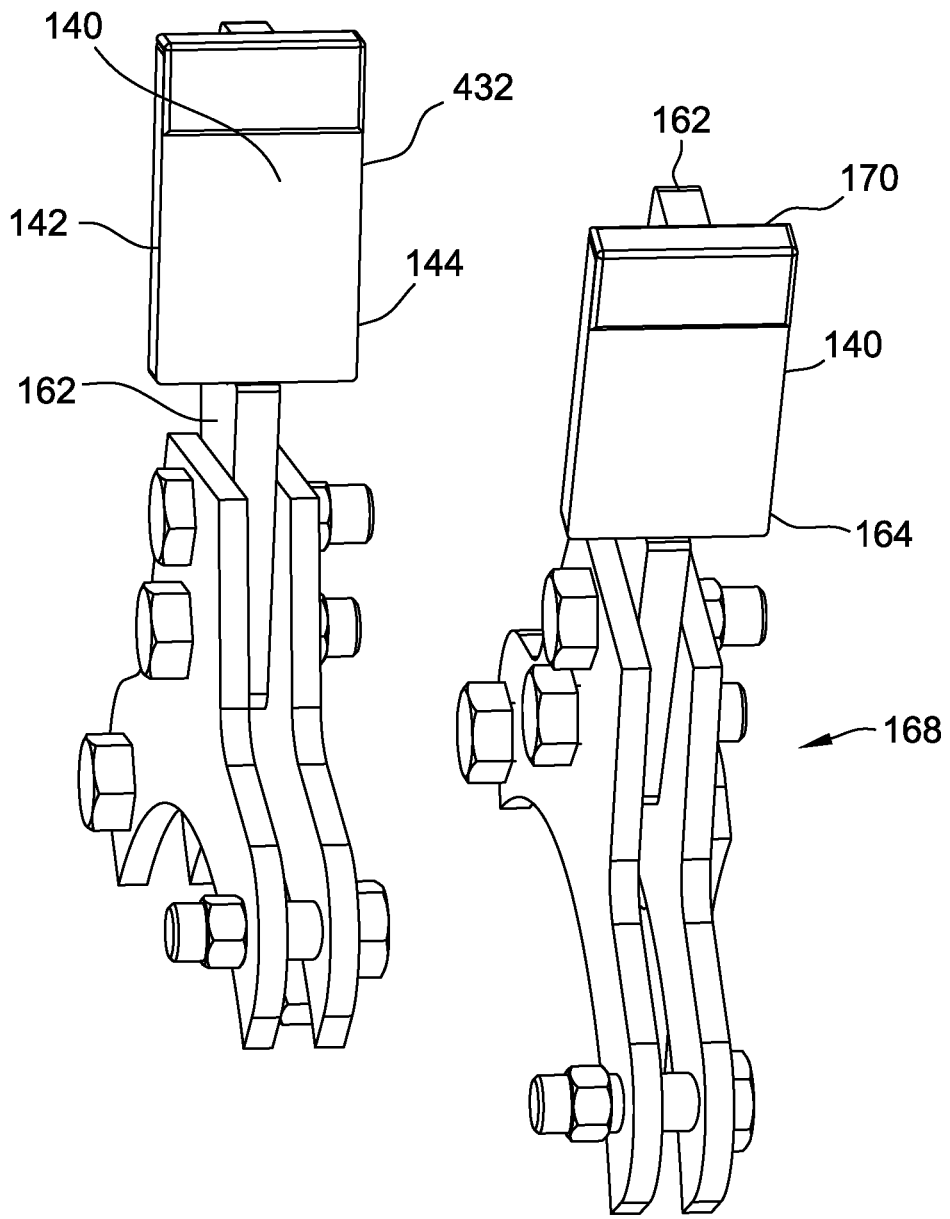
FIG. 7 is a perspective view of the dispersal paddles of the drum assembly.

Referring now to FIG. 7, each dispersal paddle 132 may have a dispersal paddle material-engaging surface 140 (or simply "material-engaging surface") that may contact material as the drum 102 rotates. The material-engaging surface 140 extends between a first edge 142 and a second edge 144 of the dispersal paddle. In this illustrated embodiment, the material-engaging surface 140 is perpendicular to the central plane $P_{102}$ (i.e., parallel to the rotational axis $A_{102}$ when the paddle is viewed from the front). In other example embodiments, the dispersal material-engaging surface 140 of the dispersal paddle and the center plane form an acute angle λ (FIG. 4). For example, the acute angle λ may be between 70° and 90°. In such embodiments, the first 140 and/or second edge 142, 144 of the dispersal paddle 132 is a leading edge (relative to the rotational path of the paddle 132) and the other edge 140, 142 is a trailing edge.

In the illustrated embodiments, each dispersal paddle 132 includes a base 162 and a paddle member 164 that extends from the base 162. The base 162 may be connected to the drum 102 by a mounting assembly 168 (e.g., having brackets, fasteners, welded connections or other mounting components for attachment to the drum 102). The base 162 may be connected to a back side 170 of the paddle portion 164 to provide support for the dispersal paddle 132 as it rotates.

Figure 8:
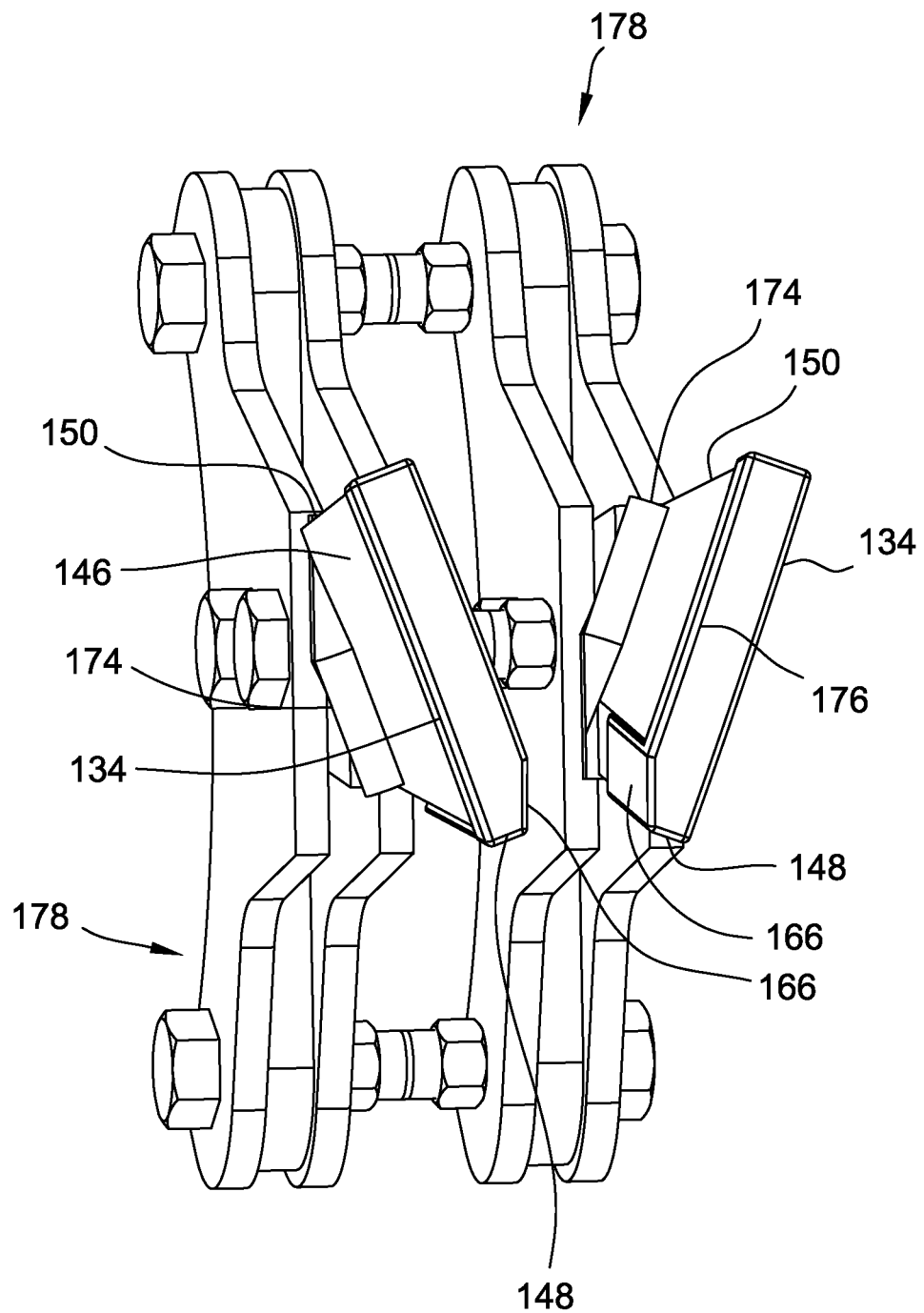
FIG. 8 is a perspective view of the spreading paddles of the drum assembly.

Referring now to FIG. 8, each spreading paddle 134 includes a spreading paddle material-engaging surface 146 that contacts material as the drum 102 rotates. The material-engaging surface 146 extends between a leading edge 148 and a trailing edge 150 of the spreading paddles 134. The material-engaging surface 146 is angled away from the central plane $P_{102}$ (FIG. 3) from the leading edge 148 to the trailing edge 150 of the spreading paddle 134 (i.e., the leading edge 148 is closer to the central plane $P_{102}$ than the trailing edge 150). The material-engaging surface 146 and the center plane $P_{102}$ may form an acute angle β (FIG. 4). The acute angle β may be greater than 0°, greater than 0° and less than 45°, greater than 0° and less than 30°, between 5° and 45°, between 5° and 30° or between 5° and 25°. In other embodiments, the spreading paddle 134 and the center plane $P_{102}$ are substantially parallel (i.e., β is zero and the leading or "cutting" edge of the paddle becomes the surface which first engages material as the drum 102 rotates).

Each spreading paddle 134 includes a base 174 and a paddle member 176 that extends from the base 174. The base 174 may be connected to the drum 102 by a mounting assembly 178 (e.g., having brackets, fasteners, welded connections or other mounting components for attachment to the drum 102).

Figure 9:
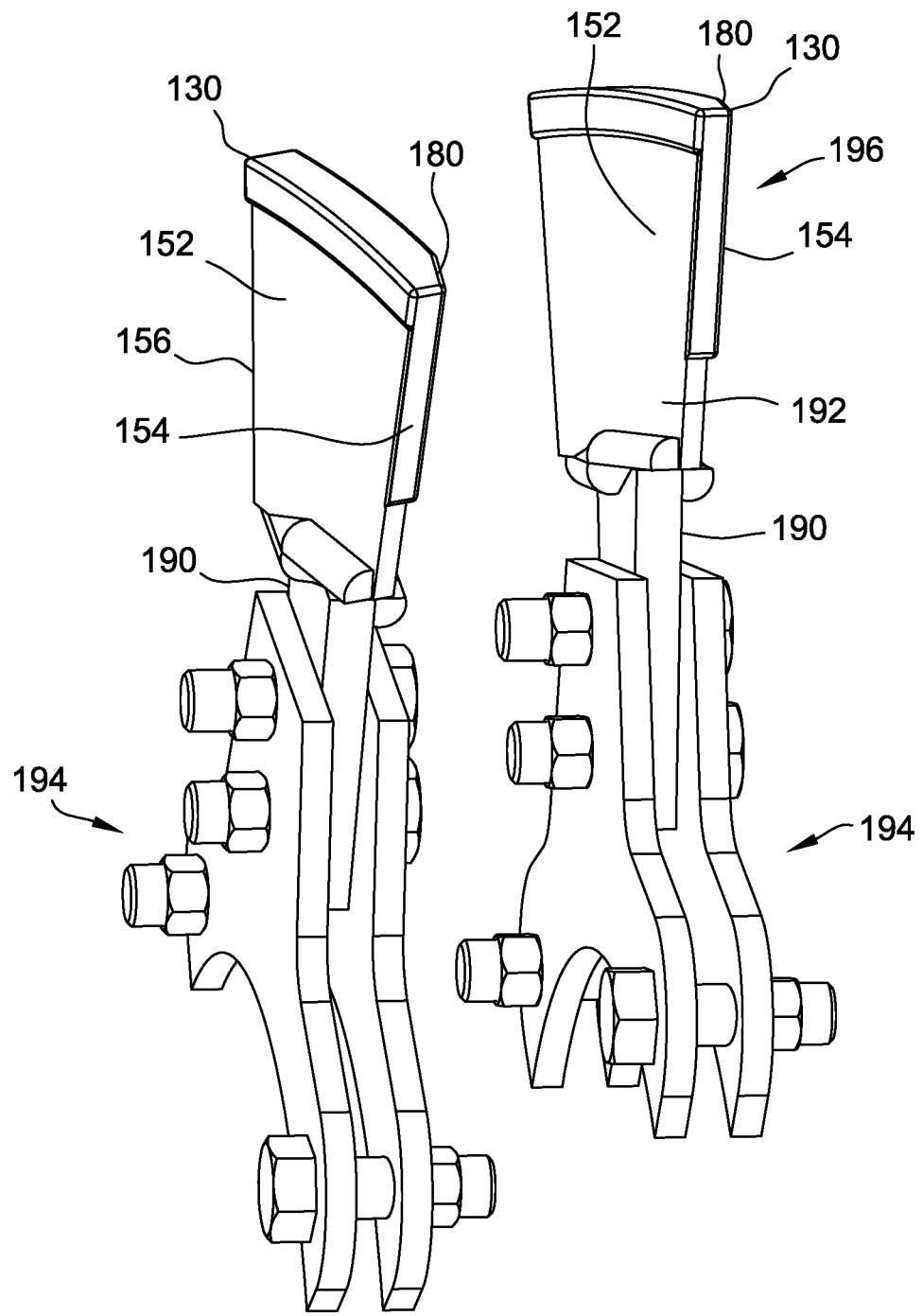
FIG. 9 is a perspective view of the centering paddles of the drum assembly.

Referring now to FIG. 9, each of the centering paddles 130 have a centering paddle material-engaging surface 152 extending between a leading edge 154 and a trailing edge 156 of the centering paddle 130. The material-engaging surface 152 is angled toward the central plane $P_{102}$ (FIG. 3) from the leading edge 154 to the trailing edge 156 (i.e., the trailing edge 156 is closer to the center plane $P_{102}$ than the leading edge 154). The material-engaging surface 152 and the center plane $P_{102}$ may form an acute angle α. The acute angle α may be greater than 0°, greater than 0° and less than 45°, greater than 0° and less than 30°, between 5° and 45°, between 5° and 30° or between 5° and 25°.

Each centering paddle 130 includes a base 190 and a paddle member 192 that extends from the base 190. The base 190 may be connected to the drum 102 by a mounting assembly 194 (e.g., having brackets, fasteners, welded connections or other mounting components for attachment to the drum 102).

In the illustrated embodiment, the plurality of centering paddles 130, the plurality of dispersal paddles 132, and the plurality of spreading paddles 134 are connected to the drum 102 such that the paddles 130, 132, 134 extend radially outward from the drum 102 (i.e., along a radial line generally perpendicular to the rotational axis $A_{102}$). In alternative embodiments, the paddles 130, 132, 134 may be coupled to the drum 102 at an angle, such the material-engaging surface of the paddles is angled toward the center plane or angled away from the center plane $P_{102}$ (i.e., tilted forward or back relative to the radial line).

Figure 6:
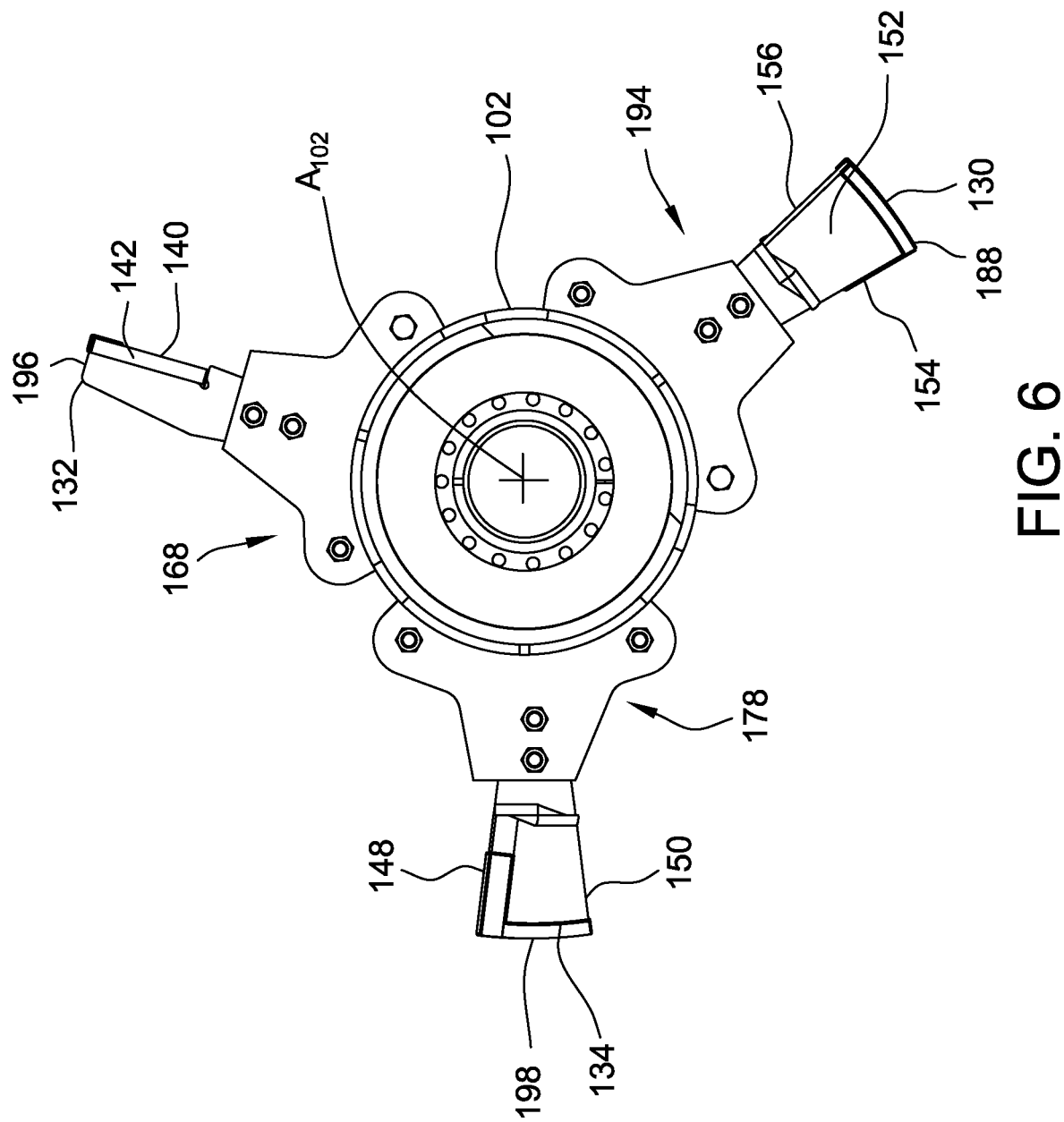
FIG. 6 is a side view of centering paddles, dispersal paddles, and spreading paddles of the drum assembly.

Each of the centering paddles 130, dispersal paddles 132 and spreading paddles 134 may have an outer edge 188, 196, 198 (FIG. 6). In some embodiments, the outer edge 188, 196, 198 of each paddle is about the same radial distance from the rotational axis $A_{102}$.

The spreading paddles 134 (FIG. 8) include a tapered edge 166 to promote cutting and separation of material. The tapered edge 166 extends to the leading edge 148 of the spreading paddles 134. The centering paddles 130 (FIG. 9) may also include a tapered edge 180 that extends to the leading edge 154 of the centering paddles 130. The leading edges 148, 154 of the spreading and centering paddles 134, 130 may be blunt or relatively sharp depending on the type of material being cut and/or broken apart and the desired effect of the paddle 134, 130.

The material-engaging surfaces 140, 146, 152 of the paddles 130, 132, 134 are planar surfaces. In alternative embodiments, the material-engaging surfaces 140, 146, 152 may include a curved surface, such as a scoop. In such embodiments, the angle of the material-engaging surface and the center plane may be measured at a mid-point between the leading and trailing edges of the paddle). In some example embodiments, the centering paddles 130 may have a tail feature (not shown) extending from the trailing edge 156. The tail feature may guide material to help form the desired windrow shape.

In the illustrated embodiments, the dispersal paddles 132, spreading paddles 134 and the centering paddles 130 are coupled with respect to the drum 102, such that the paddles 130, 132, 134 are fixed relative to the drum 102 (i.e., not hinged). Specifically, the paddles 130, 132, 134 may be unable to rotate or translate relative to the drum 102. In some alternative embodiments, the dispersal paddles 132, the spreading paddles 134, and/or the centering paddles may be pivotally coupled (e.g., flail type paddles).

Figure 3:
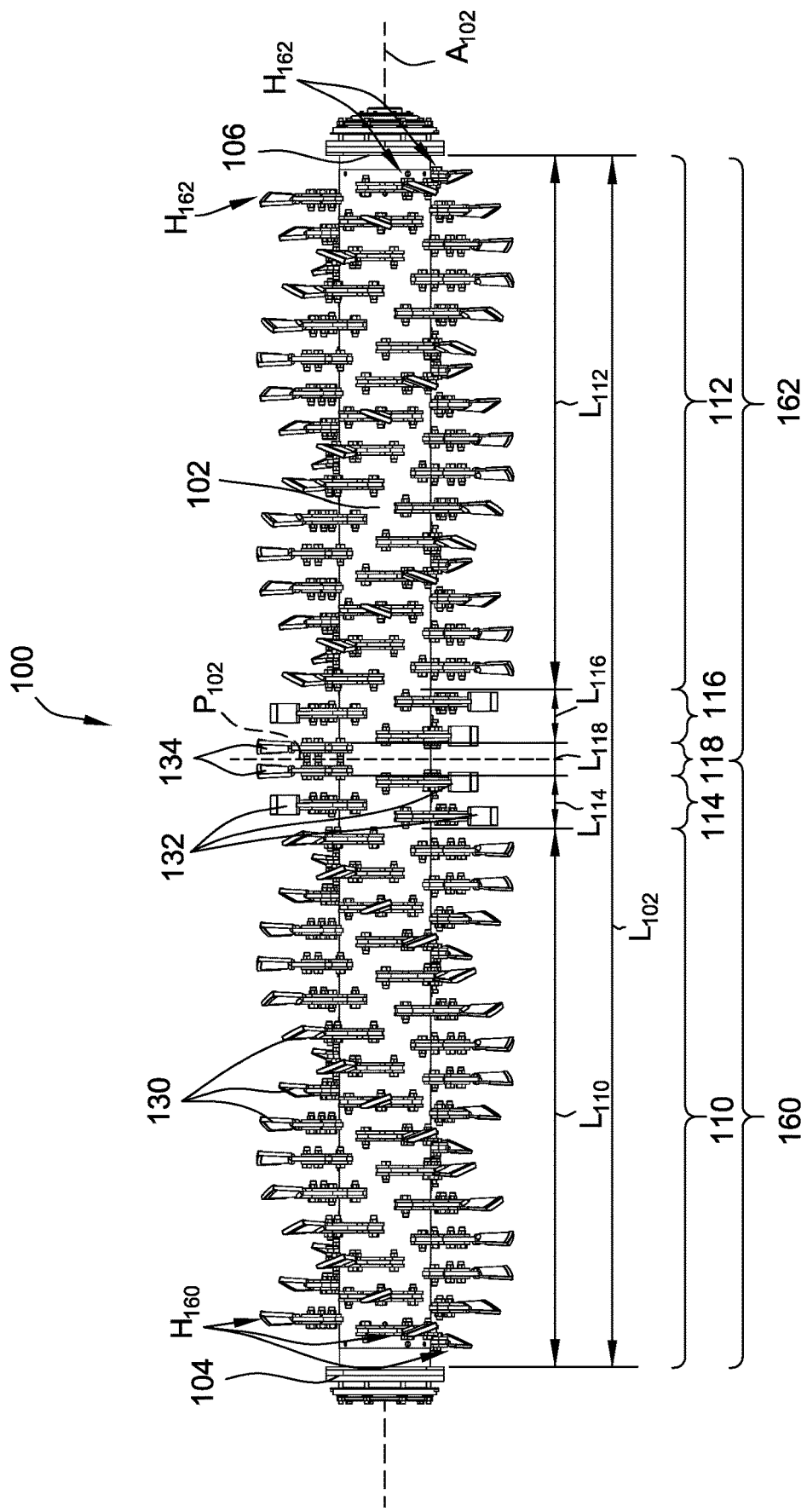
FIG. 3 is a front view of the drum assembly.

The centering paddles 130, dispersal paddles 132, and/or spreading paddles 134 may be connected to the drum 102 in one or more helical patterns about the rotational axis $A_{102}$. As shown in FIG. 3, the drum assembly 100 includes three left handed helices $H_{160}$ (i.e., a triple helix) of paddles on the first side 160 of the drum assembly 100 and three right-handed helices $H_{162}$ (i.e., a triple helix) of paddles on the second side 162 of the drum assembly 100. Each of the left handed helices $H_{160}$ and each of the right handed helices $H_{162}$ include centering paddles 130 and dispersal paddles 132.

In some embodiments, the spreading paddles 134 may be arranged in a pattern with the centering paddles 130 and the dispersal paddles 132 to form one or more left handed helixes and one or more right handed helixes. For example, one of the left handed helices and one of the right handed helices each includes one or more spreading paddles 134 in addition of the centering paddles 130 and dispersal paddles 132.

The drum assembly 100 includes at least one pair of spreading paddles 134. The individual spreading paddles 134 of each pair of spreading paddles 134 are arranged opposite each other across the central plane $P_{102}$.

Referring now to FIG. 3, the drum 102 has a length $L_{102}$ extending from the first end 104 to the second end 106. The first outer portion 110 of the drum 102 has a first outer portion length $L_{110}$, the second outer portion 112 of the drum 102 has a second outer portion length $L_{112}$, and the central portion has a central portion length $L_{118}$. The first intermediary portion 114 has a first intermediary portion length $L_{114}$ and the second intermediary portion 116 has a second intermediary portion length $L_{115}$. In the illustrated embodiment, the central portion length $L_{118}$ is less than each of the first and second outer portion lengths $T_{110}$, $L_{112}$ and is less than the each of the first and second intermediary portion lengths $L_{114}$, $L_{115}$. Each of the first and second intermediary portion lengths, $L_{114}$, $L_{116}$ are less than each of the first and second outer portion lengths $L_{110}$, $L_{112}$.

In some embodiments, the first outer portion length $L_{110}$ is at least 25%, at least 33% or at least 40% of the length $L_{102}$ of the drum 102. The second outer portion length $L_{112}$ may also be at least 25%, at least 33% or at least 40% of the length $L_{102}$ of the drum 102.

The first intermediary portion length $L_{114}$ may be at least 5%, at least about 10%, or no more than 33%, no more than 25%, or no more than 20% of the length $L_{102}$ of the drum 102. The second intermediary portion length $L_{116}$ may be at least 5%, at least 10%, no more than 33%, no more than 25%, or no more than 20% of the length $L_{102}$ of the drum 102. The recited lengths of the drum portions are exemplary and the lengths may fall outside of the recited ranges unless stated otherwise.

Compared to conventional drum assemblies for turning material, the drum assemblies of embodiments of the present disclosure have several advantages. Use of centering paddles allows material to be thrown toward the center of the drum and of the windrow. The centering paddles may also cut the compost material. Dispersal paddles break-up and aerate the compost material. Spreading paddles propel material away from the center of the windrow. The combination of paddles result in improved turning and aeration of the windrow. The windrow may have a taller peak and narrower base which increases the length of the sides of the windrow and improves aeration.

Use of spreading and dispersal paddles relatively near the center of the drum causes material to move away from the drum which reduces recirculation of material relative to other drum assemblies. By reducing recirculation, the drag on the drum assembly is reduced which decreases power consumption and increased the efficiency of the drum. Reducing recirculation also reduces the wear on the paddles as the paddles experience less force on the material-engaging surfaces during windrow turning and the shaping process.

The drum assembly may provide proper windrow turning and shaping while improving productivity. For example, compost turners that include a drum assembly of embodiments of the present disclosure may travel faster along the windrow (e.g., about 5 feet per minute faster) relative to conventional drum assemblies using the same power consumption.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A drum assembly for turning material, the drum assembly comprising:
    a drum including a first end, a second end, a rotational axis extending through the first end and the second end about which the drum rotates, and a central plane perpendicular to the rotational axis, the drum comprising:
        a first outer portion;
        a second outer portion;
        a central portion, the center plane extending through the central portion;
        a first intermediary portion disposed between the first outer portion and the central portion; and
        a second intermediary portion disposed between the second outer portion and the central portion;
    a plurality of centering paddles connected to the drum and configured to move material toward the central plane;
    a plurality of dispersal paddles connected to the drum and configured to move material away from the drum in a direction generally perpendicular to the rotational axis; and
    a plurality of spreading paddles connected to the drum and configured to move material away from the central plane, wherein:
        a majority of paddles in the first outer portion are centering paddles;
        a majority of paddles in the second outer portion are centering paddles;
        a majority of paddles in the center portion are spreading paddles;
        a majority of paddles in the first intermediary portion are dispersal paddles; and
        a majority of paddles in the second intermediary portion are dispersal paddles.

2. The drum assembly as set forth in claim 1 wherein the dispersal paddles each have a material-engaging surface that contacts material as the drum rotates, the material-engaging surface extending between a leading edge and a trailing edge of the dispersal paddle, the material-engaging surface and center plane forming an acute angle between 70° and 90°.

3. The drum assembly as set forth in claim 1 wherein the spreading paddles each have a material-engaging surface that contacts material as the drum rotates, the material-engaging surface extending between a leading edge and a trailing edge of the spreading paddle, the material-engaging surface angling away from the central plane from the leading edge to the trailing edge.

4. The drum assembly as set forth in claim 1 wherein the spreading paddle is substantially parallel to the central plane.

5. The drum assembly as set forth in claim 1 wherein the centering paddles each have a material-engaging surface that contacts material as the drum rotates, the material-engaging surface extending between a leading edge and a trailing edge of the centering paddle, the material-engaging surface angling toward the central plane from the leading edge to the trailing edge.

6. The drum assembly as set forth in claim 1 wherein each dispersal paddle has a weight equivalent to a weight of each spreading paddle and has a weight equivalent to each centering paddle.

7. The drum assembly as set forth in claim 1 wherein the dispersal paddles, spreading paddles and centering paddles are each fixed with respect to the drum.

8. The drum assembly as set forth in claim 1, wherein:
the centering paddles are connected to the drum in a helical pattern about the rotational axis; and
the dispersal paddles are connected to the drum in a helical pattern about the rotational axis.

9. The drum assembly as set forth in claim 8 wherein the central plane divides the drum assembly into a first side and a second side, the drum assembly comprising:
one or more left handed helixes of paddles on the first side of the drum assembly, each left handed helix of paddles comprising centering paddles and dispersal paddles; and
one or more right handed helixes of paddles on the second side of the drum assembly, each right handed helix of paddles comprising centering paddles and dispersal paddles.

10. The drum assembly as set forth in claim 1 comprising at least one pair of spreading paddles, the paddles of each pair of spreading paddles being arranged opposite each other across the central plane.

11. The drum assembly as set forth in claim 1 wherein the first outer portion of the drum has a first outer portion length, the second outer portion of the drum has a second outer portion length, the central portion has a central portion length, the first intermediary portion has a first intermediary portion length, and the second intermediary portion has a second intermediary portion length, wherein the central portion length is less than each of the first and second outer portion lengths and is less than each of the first and second intermediary portion lengths, and wherein each of the first and second intermediary portion lengths is less than each of the first and second end portion lengths.

12. The drum assembly as set forth in claim 1 wherein the material-engaging surface of each paddle is tilted forward or back relative to a radial line extending from the rotational axis.

13. The drum assembly as set forth in claim 1 wherein the spreading paddles, dispersion paddles, and centering paddles are arranged to form mirror images across the central plane.

14. The drum assembly as set forth in claim 1 wherein:
at least 67%, at least 75%, at least 90% or all of paddles in the first outer portion are centering paddles;
at least 67%, at least 75%, at least 90% or all of paddles in the second outer portion are centering paddles;
at least 67%, at least 75%, at least 90% or all of paddles in the center portion are spreading paddles;
at least 67%, at least 75%, at least 90% or all of paddles in the first intermediary portion are dispersal paddles; and
at least 67%, at least 75%, at least 90% or all of paddles in the second intermediary portion are dispersal paddles.

15. A compost turner for turning a windrow of compost, the compost turner comprising the drum assembly as set forth in claim 1.

16. A drum assembly for turning material, the drum assembly comprising:
a drum including a first end, a second end, a rotational axis extending through the first end and the second end about which the drum rotates, and a central plane perpendicular to the rotational axis, the drum comprising:
a first outer portion;
a second outer portion;
a central portion, the center plane extending through the central portion;
a first intermediary portion disposed between the first outer portion and the central portion; and
a second intermediary portion disposed between the second outer portion and the central portion;
a plurality of centering paddles connected to the first outer portion of the drum, the centering paddles each having a material-engaging surface that contacts material as the drum rotates, the material-engaging surface extending between a leading edge and a trailing edge of the centering paddle, the material-engaging surface angling toward the central plane from the leading edge to the trailing edge;
a plurality of centering paddles connected to the second outer portion of the drum, the centering paddles each having a material-engaging surface that contacts material as the drum rotates, the material-engaging surface extending between a leading edge and a trailing edge of the centering paddle, the material-engaging surface angling toward the central plane from the leading edge to the trailing edge;
a plurality of dispersal paddles connected to the first intermediary portion, the dispersal paddles each have a material-engaging surface that contacts material as the drum rotates, the material-engaging surface being perpendicular to the central plane;
a plurality of dispersal paddles connected to the second intermediary portion, the dispersal paddles each have a material-engaging surface that contacts material as the drum rotates, the material-engaging surface being perpendicular to the central plane; and
a plurality of spreading paddles connected to the center portion of the drum, the spreading paddles (1) being parallel to the central plane or (2) each having a material-engaging surface that contacts material as the drum rotates, the material-engaging surface extending between a leading edge and a trailing edge of the spreading paddle, the material-engaging surface angling away from the central plane from the leading edge to the trailing edge.

17. The drum assembly as set forth in claim 16 wherein the spreading paddle material-engaging surface and center plane form an acute angle, the acute angle being greater than 0°, greater than 0° and less than 45°, greater than 0° and less than 30°, between 5° and 45°, between 5° and 30° or between 5° and 25°.

18. The drum assembly as set forth in claim 16 wherein the centering paddle material-engaging surface and center plane form an acute angle greater than 0°, greater than 0° and less than 45°, greater than 0° and less than 30°, between 5° and 45°, between 5° and 30° or between 5° and 25°.

19. A drum assembly for turning material, the drum assembly comprising:
a drum including a first end, a second end, a rotational axis extending through the first end and the second end about which the drum rotates, and a central plane perpendicular to the rotational axis, the central plane dividing the drum assembly into a first side and a second side;
a plurality of centering paddles connected to the drum and configured to move material toward the central plane;

a plurality of dispersal paddles connected to the drum and configured to move material away from the drum in a direction generally perpendicular to the rotational axis; and a plurality of spreading paddles connected to the drum and configured to move material away from the central plane, wherein the centering paddles, dispersal paddles and spreading paddles are configured to form a first helix on the first side of the drum and to form a second helix on the second side of the drum.

20. The drum assembly as set forth in claim 19 wherein, in the first helix:

a first portion of the centering paddles are connected to the drum toward the first end of the drum, a spreading paddle is connected to the drum toward the center plane, and a first portion of the dispersal paddles are connected to the drum such that the first portion of the dispersal paddles are disposed between centering paddles and the spreading paddle;

and wherein, in the second helix:

a second portion of the centering paddles are connected to the drum toward the second end of the drum, a spreading paddle is connected to the drum toward the center plane, and a second portion of the dispersal paddles are connected to the drum such that dispersal paddles are disposed between the second portion of centering paddles and the spreading paddle.

\* \* \* \* \*